Sept. 6, 1949.  H. B. MARIS  2,480,867
AIRCRAFT INSTRUMENT
Filed July 24, 1943  3 Sheets-Sheet 1

INVENTOR.
Harry B. Maris
BY
*S. E. Bush*
ATTORNEY

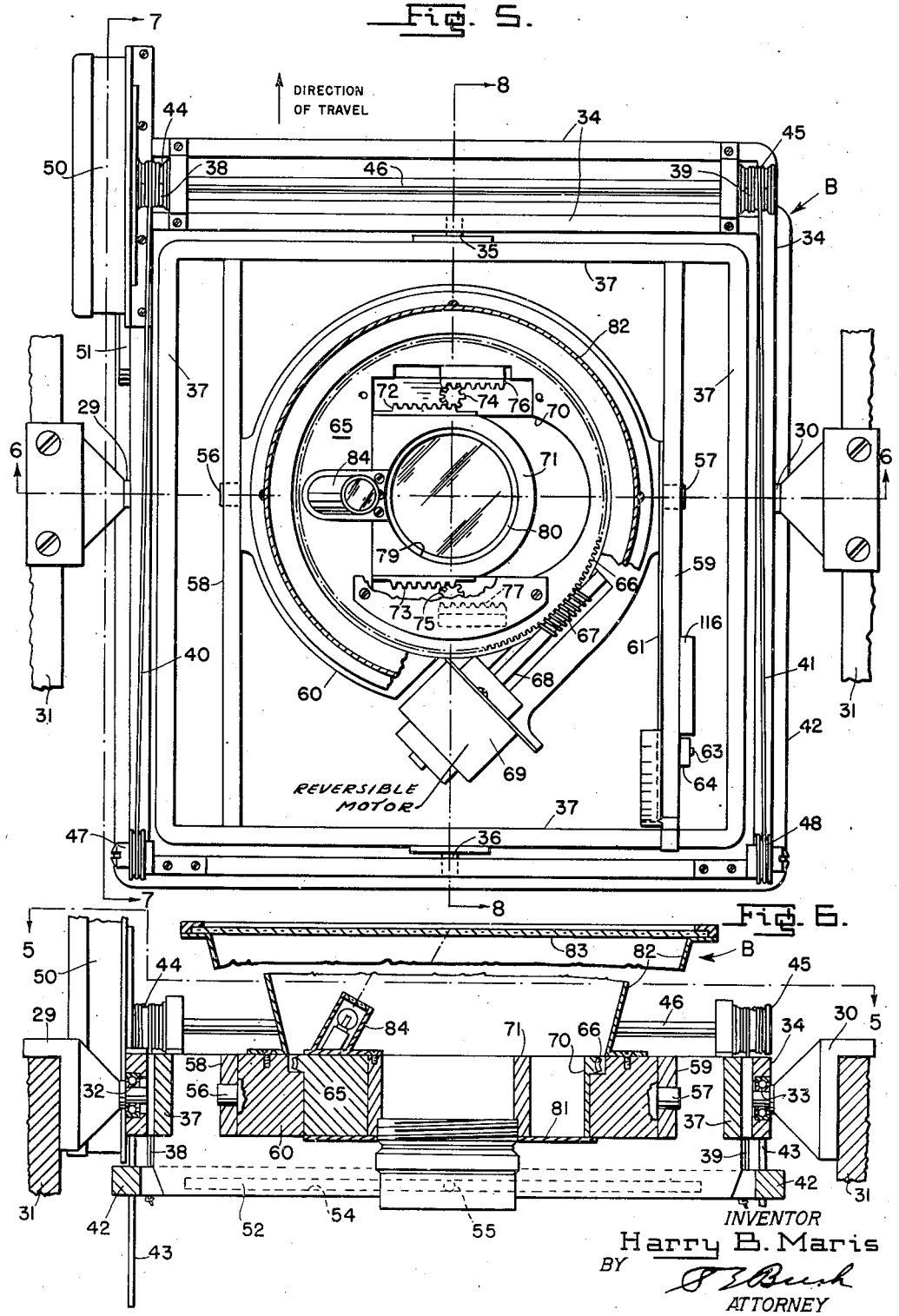

Sept. 6, 1949.  H. B. MARIS  2,480,867
AIRCRAFT INSTRUMENT
Filed July 24, 1943  3 Sheets-Sheet 3
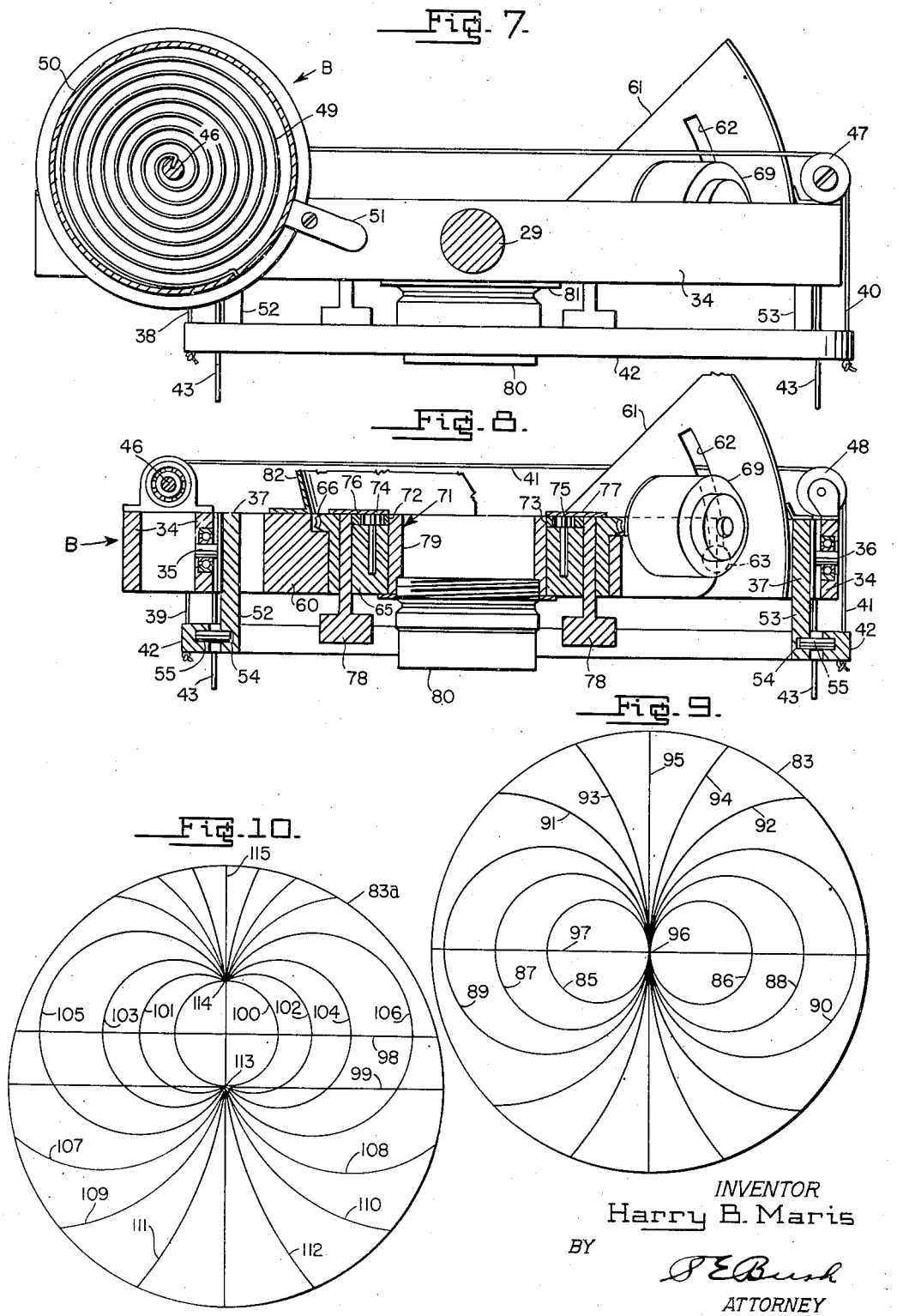
INVENTOR
Harry B. Maris
BY
S. E. Bush
ATTORNEY Patented Sept. 6, 1949

2,480,867

UNITED STATES PATENT OFFICE 2,480,867

AIRCRAFT INSTRUMENT

Harry B. Maris, Riverdale, Md., assignor to the United States of America as represented by the Secretary of the Navy Application July 24, 1943, Serial No. 495,994

12 Claims. (Cl. 33—46.5)

(Granted under the act of March 3, 1883, as amended April 30, 1928; 370 O. G. 757)

The invention relates to improvements in aircraft instruments and more particularly to vertical indicators and sighting devices for use in conjunction with aerial photography and the dropping of bombs from aircraft.

An important object of the invention is to provide an aircraft bank indicator of economical design and construction.

Another important object of the invention is the provision of an instrument which will indicate angles of bank up to 90° with increasing accuracy as the angle of bank increases, when the aircraft is flying in curved balanced flight.

A further object resides in the provision of mechanism for supporting an aerial camera with its axis vertical during curved balanced flight of an airplane.

Yet another object is to provide means for supporting a bomb sight in a stabilized position relative to the ground during curved balanced flight of an airplane.

A still further object is the provision of a bomb sight with means compensating for various flight conditions, such as ground speed, altitude and wind velocity.

Figure 1:
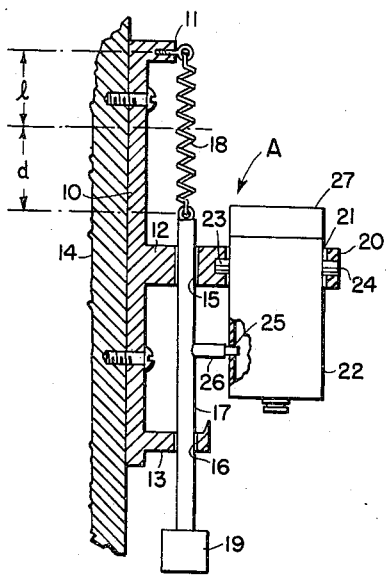
Figure 2:
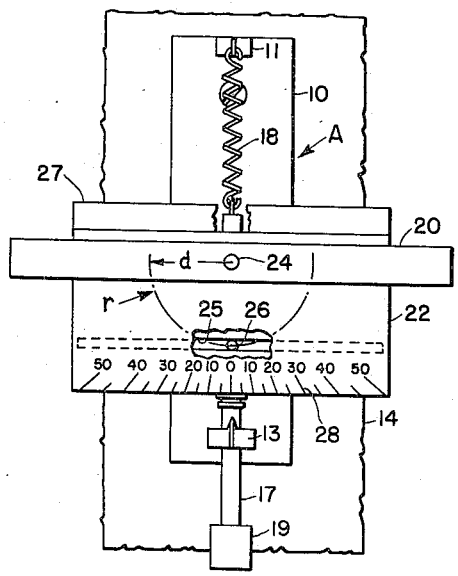
Figure 3:
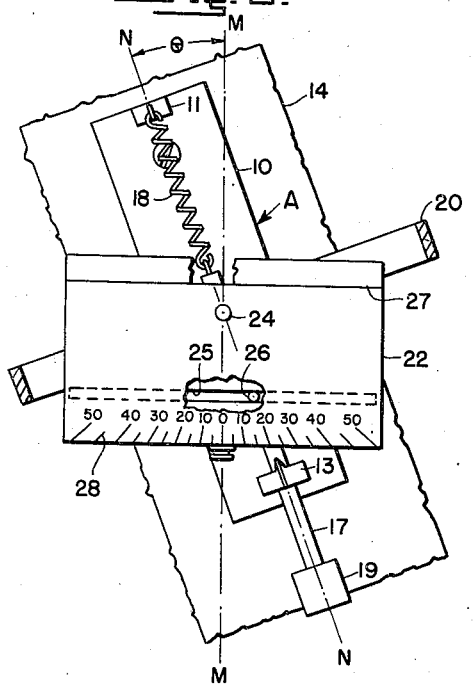
Figure 4:
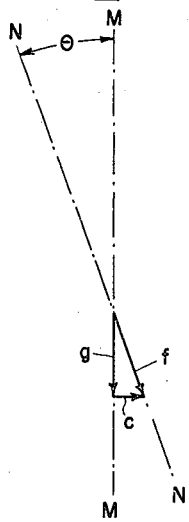

Other objects and advantages of the invention will become apparent during the course of the following detailed description, taken in connection with the accompanying drawings, forming a part of this specification, and in which drawings, Figure 1 is a view partly in side elevation and partly in central vertical longitudinal section of an instrument embodying the principles of the present invention, Figure 2 is a view in front elevation of the instrument with portions thereof broken away, Figure 3 is a view similar to Figure 2 but illustrating the relationship of parts when the airplane is in curved balanced flight, Figure 4 is a diagram of the forces acting on the instrument to dispose its parts as shown in Figure 3, Figure 5 is a horizontal sectional view of a sighting device embodying the principles of the invention, the view being taken substantially on the line 5—5 of Figure 6, Figures 6, 7 and 8 are vertical transverse sectional views taken substantially on their respective lines in Figure 5, Figures 9 and 10 are plan views of differently delineated screens for use with the sighting device shown in Figures 5-8.

In the drawings, which show alternate forms of the invention, and wherein similar reference characters denote corresponding parts throughout the several views, the letter A generally designates the improved bank indicator and B, the sighting device.

Referring more particularly to Figures 1-3 of the drawings, the bank indicator A includes a bracket 10 carrying spaced parallel arms 11, 12 and 13. The bracket 10 is secured to a portion 14 of an aircraft so as to extend in the direction of the vertical axis of the aircraft and with the arms 11, 12 and 13 extending in the direction of the longitudinal axis of the aircraft. Formed in the arms 12, 13 are axially aligning openings 15, 16 slidably receiving a normally vertical rod 17 resiliently connected at its upper end to the arm 11, as by an expansion coil spring 18 having an unextended length $l$. Fixed to the lower end of the rod 17 is a weight 19 extending the spring 18 a distance $d$ due to gravity when the rod 17 is in its normally vertical position.

Carried by the arm 12 is a normally horizontal frame 20 defining an opening 21 in which a camera 22 is mounted for swinging movement transversely of the airplane, as by axially aligning pivots 23, 24. The axis of the pivots 23, 24 extends in the direction of the longitudinal axis of the airplane and is normal to the longitudinal axis of the rod 17. Formed in an exterior wall of the camera 22 is a rectilinear slot 25 tangent to an arc $r$ whose center lies on the axis of the pivots 23, 24 and whose radius equals the distance $d$ of extension of the spring 18.

Perpendicularly fixed to the rod 17 is a pin 26 normally intersecting the arc $r$ and slidably fitted in the rectilinear slot 25. The camera 22 may be suitably balanced for swinging movement about the pivots 23, 24, as by a weight 27. If desired, a scale 28 may be provided for indicating in degrees the angular relation of the rod 17 to the camera 22.

Assuming the aircraft to be flying level and on a straight course, the instrument A will occupy the position shown in Figures 1 and 2, wherein gravity and the spring 18 exert equal but opposite forces on the rod 17, and the pin 26 floats halfway between the ends of the slot 25 so as to maintain the axis of the camera 22 vertical. During a turn requiring banking of the airplane at an angle $\theta$ to maintain balanced flight, the bracket 10 participates in the banking movement so that the longitudinal axis of reciprocation of the rod 17 is rotated. The camera 22 of course tends to remain with its optical axis vertical due to inertia. Referring more particularly to the diagram shown in Figure 4, the force of gravity $g$ on the rod and weight acts downwardly along the vertical axis M—M and the centrifugal force $c$ generated by the curved balanced flight acts laterally or normal to the axis M—M. The resultant force $f$ acts in the direction of the axis N—N defined by the angle $\theta$. Since the resultant force $f$ is greater than the force of gravity $g$, the spring 18 is extended beyond the distance $d$ and the pin 26 moves along the slot 25 away from the axis of the pivots 23, 24, by an amount just sufficient to maintain the position of the camera 22 in space. Thus, the angle between the rod 17 and the camera 22 as indicated on the scale 28 is the angle of bank of the aircraft while in curved balanced flight.

Referring now to Figures 5–10 of the drawings, the sighting device B illustrated therein is so constructed as to operate in accordance with the principles of operation of the bank indicator A. In addition the sighting device B includes means compensating for various conditions encountered during horizontal aircraft bombing operations, such as aircraft speed, elevation and wind velocity. Mounted for swinging movement about an axis transversely of the aircraft, as by pivots 29, 30 secured to portions 31 of the aircraft and provided with anti-friction bearings 32, 33, is an outer gimbal frame 34. Mounted for swinging movement about an axis longitudinally of the aircraft, as by pivots 35, 36 rotatably carried by the outer gimbal frame 34, is an inner gimbal frame 37. This frame 37 is to be maintained parallel to the ground, when the aircraft is in curved balanced flight, by means hereinafter described, responsive to the force of gravity and to centrifugal force.

Suspended beneath the outer gimbal frame 34 as by cables 38—41, one at each corner, is a rectangular weight 42, guided for sliding movement toward and away from the outer gimbal frame 34, as by rods 43 fixed to the outer gimbal frame 34 and extending through openings in the corners of the rectangular weight 42. The cables 38, 39 are attached to one side of the weight 42 and are secured to spools 44, 45 fastened on a shaft 46 rotatably supported by the outer gimbal frame 34. The cables 40, 41 are attached to the opposite side of the weight 42, pass over pulleys 47, 48, on the outer gimbal frame 34, and are secured to the spools 44, 45. Secured to one end of the shaft 46 is the inner end of a spiral spring 49 having its outer end attached to a cylindrical case 50 releasably fixed against rotation relative to the outer frame 34, as by a dog 51.

Extending downwardly from opposite sides of the inner gimbal frame 37, as shown more particularly in Figures 6 and 8, are depending aprons 52, 53 each provided along its lower marginal edge portion with a rectilinear outwardly facing groove 54. Rigidly secured to opposite sides of the weight 42 at the mid-points thereof are pins 55 extending into and slidable along the grooves 54.

Mounted for rotation about the transverse axis of the airplane, as by pivots 56, 57 carried by cross-bars 58, 59 forming part of the inner gimbal frame 37 is an annular frame 60 releasably securable in any one of a plurality of angularly adjusted positions with respect to the inner gimbal frame 37, as by a sector 61 fixed for swinging movement with the annular frame 60. Extending through an arcuate slot 62 in the sector is a set screw 63 fastened to the cross-bar 59 as by nut 64. Supported in the annular frame 60 is a rotary member 65 provided with a worm wheel 66 meshing with a worm 67 fastened on the shaft 68 of a variable speed reversible motor 69.

Mounted for movement radially of the rotary member 65 along a suitable slot 70 therein, is a carriage 71 provided on opposite sides with racks 72, 73, meshing with pinions 74, 75 pivoted on the rotary member 65. Also meshing with the pinions 74, 75 are racks 76, 77 reciprocably mounted in the rotary member 65 and carrying weights 78, as shown more particularly in Figure 8, for balancing the rotary member 65 in any radially adjusted position of the carriage 71. Fixed in a perpendicular opening 79 extending through the carriage, as by screw threaded engagement therewith is a tubular lens holder 80 carrying a plate 81 covering the slot 70 so as to prevent the entrance of light into the camera when the lens holding carriage 71 is in any position of adjustment relative to the slot 70. Secured to the annular frame 60 is an inverted frusto-conical tube 82 supporting a ground glass viewing screen 83 in elevated parallel relation to the frame 60. Fastened to the carriage 71 is a light 84 focused on a point centrally of the screen 83 when the carriage 71 is centered in the rotary member 65, as shown in Figure 6.

The strength of the spring 49 and the size of the rectangular weight 42 are so chosen that the gravity pull on the weight 42 will unwind the cables 38—41 from the shaft 46 a distance equal to the distance between the axes of the pivots 35, 36 and the pins 55. Exact adjustment of the length of the cables 38—41 is made in order to dispose the weight 42 at a level just sufficient to freely support the pins 55 in the slots 54. This adjustment may be made by rotating the spring case 50 and clamping the case in adjusted position by means of the dog 51. Thus the conditions specified for $g$ in the bank indicator A shown in Figures 1–4 are similarly met in the sighting device B; movement of the pins 55 along the grooves 54 will measure $c$ as in Figure 4; and the length of the cables 38—41 unwound from the shaft 46 during operation of the device will measure $f$. Whenever the plane is in balanced flight so that the direction of $f$ is parallel to the vertical axis of the plane, the distance the pins 55 have moved along the grooves 54 will be a measure of the centrifugal force and the inner gimbal frame 37 will be maintained horizontal. The pivots 29, 30 permit swinging movement of the outer gimbal frame 34 about an axis transversely of the airplane so that the frame 34 may remain horizontal during steady forward flight although the longitudinal trim of the aircraft may vary due to changes in the amount or location of the cargo or passenger load carried by the aircraft.

The ground glass viewing screen 83, as shown in Figure 9, is provided with a plurality of circles 85—90 and arcs 91—94 of varying radii each tangent to a longitudinal diametrical line 95 at its center 96, the centers of the circles and arcs lying on a transverse diametrical line 97 passing through the center 96. This screen 83 may be used for observing or photographing an area vertically below the aircraft carrying the device B. In this case, the annular frame 60 would be fixed in the plane of the inner gimbal frame 37, by securing the sector 61 in proper relation to the cross-bar 59 at the nut 64. If the airplane is so piloted in curved balanced flight that the image of a ground object on the screen 83 describes a circle passing through the center 96 of the screen, then the airplane will follow a circular course passing directly over the object on the ground. The circle described by the image will be tangent to the longitudinal line 95 and its center will lie on the transverse line 97. In bombing operations, this would be a target circle with zero lead, and all such circles would be tangent to the longitudinal line 95 with their centers lying along the transverse line 97.

In the utilization of the device B as a bomb sight, the annular frame 60 is fixed at an angle relative to the inner gimbal frame 37 corresponding to the dropping or range angle determined by the aircraft speed and elevation at which the bombing operations are to be performed. The device may be used at various speeds and altitudes by providing a set of screens delineated for the various dropping or range angles. In Figure 10 is shown a viewing screen 83a designed for a predetermined dropping or range angle. This screen is provided with a transverse line 98 in parallel relation to a diametrical transverse line 99, the distance therebetween depending on the dropping or range angle. A circle 100 and arcs 101—112 are drawn from centers lying on the transverse line 98 so as to intersect at the center 113 and at a point 114 on the longitudinal diametrical line 115. If no wind correction is required, bombing target images will appear at the center 113 of the screen 83a when the lens carriage 71 is centered relative to the rotary member 65. By piloting the plane in curved balanced flight so that the image of any ground target describes on the screen 83a a circle passing through the center 113, the airplane may be brought into bombing position relative to the ground target. The circle described by the target image on the screen 83a will not be tangent to but will intersect the longitudinal line 115 at the point 113. The centers of all target circles will lie on the line 98 parallel to the transverse diametrical line 99 but displaced from it by a distance fixed by the lead angle.

The wind correction vector which determines the radial distance that the lens holding carriage 71 should be displaced from the center of the rotary member 65 to compensate for the wind velocity, may be computed from the wind velocity and aircraft elevation. The arrangement of the pinions 74, 75 is such that, as the carriage 71 is shifted for wind correction purposes, the weights 78 are oppositely moved so that the device will remain in balance. In this connection, it will be noted that the motor 69 is located opposite the spring case 50, relative to the center of the device, and the masses of these members are so selected that they compensate one another in order to provide substantially perfect balance. If necessary, a weight 116 may be fastened to the inner gimbal frame member 59 in order to completely balance the gimbal frame 37 and parts carried thereby. Since the light 84 is focused on the center 113 of the screen 83a when the lens is centered relative to the rotary member 65, displacement of the light image from the center will indicate the magnitude and direction of the wind correction.

An airplane in uniform circular flight with reference to the air will follow a prolate cycloidal path with reference to the ground providing its air speed is greater than the wind velocity. The minor radius of the cycloid will be proportional to the wind velocity and the major radius will be proportional to the plane speed through the air. If the airplane follows a circular path with reference to the ground, these conditions will be approximately reversed with reference to the air path. The wind correction serves two purposes, first to displace all images on the screen 83a to compensate for the wind correction whereby any image at the point 113 on the screen will indicate a target in bombing position and second, to guide the aviator in selecting a cycloidal path of flight relative to the ground, while flying along a circular path relative to the air which will bring him into bombing position for any chosen target. If the wind direction at the instant of release of a bomb were known in advance, the proper wind corrected cycloid could be delineated on the screen to assist in training the pilot in approaching a target while turning in a wind.

After the carriage 71 has been shifted to compensate for the magnitude of the wind correction vector, the aviator introduces the wind direction into the sighting device B by operating the motor 69 so as to orient the rotary member 65 whereby the direction of the light spot relative to the center of the screen 83a corresponds with the wind direction. The speed of the motor 69 is regulated and set so that the rate of turn of the rotary member 65 carrying the lens holder 80 is the same as that of the airplane but in the opposite direction. Thus the position of the light relative to the center of the screen constantly indicates the magnitude and direction of the wind correction vector during circular balanced flight of the aircraft relative to the air, and also indicates the phase of the cycloidal path along which any chosen image is traveling on the screen.

Although screens having wind corrected cycloids delineated thereon for predetermined flight conditions would be of use in training pilots, their employment in actual bombing operations would be extremely limited, if not impractical. However, the pilot, after utilizing such screens for training purposes and after becoming sufficiently familiar with the relationship between the circular image paths delineated on the screen 83a as designed for still air and the cycloidal paths followed by the images during circular flight in a wind, will, from the position of the wind correction vector on the screen 83a, be able to visualize, against the background of circles and arcs on the screen, the cycloidal path along which the image should move in order to reach bombing position.

Various changes may be made in the forms of the invention herein shown and described without departing from the spirit of the invention or the scope of the following claims.

The invention described herein may be manufactured and used by or for the Government of the United States of America for governmental purposes without the payment of any royalties thereon or therefor.

I claim:

1. In an instrument for indicating the vertical during balanced turning flight of an airplane, a bar provided at one end portion with a weight, means for guiding the bar for longitudinal movement in the direction of the normally vertical axis of the airplane, a member provided with a guideway, means for pivotally securing said member in neutral, balanced equilibrium for swinging movement about an axis extending longitudinally of the airplane and with a point along said guideway tangent to an arc whose center lies on said longitudinal axis, said guideway normally extending horizontally and at right angles to said longitudinally extending axis, an element carried by said bar and slidably associated with said guideway, and resilient means normally supporting the bar against longitudinal movement with said element aligning with said tangent point and with said resilient means normally strained by said bar and weight a distance substantially equal to the distance between said longitudinal axis and said tangent point.

2. In an instrument for indicating the vertical during balanced turning flight of an airplane, a bar provided at its lower end portion with a weight, means for guiding the bar for longitudinal movement in the direction of the normally vertical axis of the airplane, a member provided with a guideway, means for pivotally securing said member in neutral, balanced equilibrium for swinging movement about an axis extending longitudinally of the airplane and with a point along said guideway tangent to an arc whose center lies on said longitudinal axis, a pin fixed on said bar and slidable along said guideway, said guideway normally extending horizontally and at right angles to said longitudinally extending axis, and a spring connected to the bar and normally supporting the bar against longitudinal movement with said pin aligning with said tangent point and with said spring normally strained by said bar and weight a distance substantially equal to the distance between said longitudinal axis and said tangent point.

3. In an instrument for indicating the vertical during balanced turning flight of an airplane, a bar provided at its lower end portion with a weight, means for guiding the bar for longitudinal movement in the direction of the normally vertical axis of the airplane, a member provided with a guideway, means for pivotally securing said member in neutral, balanced equilibrium for swinging movement about an axis extending longitudinally of the airplane and with a point along said guideway tangent to an arc whose center lies on said longitudinal axis, said guideway normally extending horizontally and at right angles to said longitudinally extending axis, a pin fixed on said bar and slidable along said guideway, and an expansion coil spring connected to the bar at its upper end portion and normally supporting the bar against longitudinal movement with said pin aligning with said tangent point and with said spring normally strained by said bar and weight a distance substantially equal to the distance between said longitudinal axis and said tangent point.

4. In an airplane instrument of the character described, an element having a rectilinear guideway, means pivoting said element in neutral, balanced equilibrium about an axis extending longitudinally of the airplane with a point along said guideway tangent to an arc whose center lies on said longitudinal axis, said guideway normally extending horizontally and at right angles to said longitudinally extending axis, a weight, means guiding the weight for movement vertically of the airplane, means transmitting movement of the weight to said element including a pin slidable in said guideway, and a spring normally supporting said weight with said pin aligning with said point of tangency and with said spring normally strained by said weight an amount equal to the distance between said tangent point and said longitudinal axis.

5. In a device of the character described, an outer gimbal frame, means pivotally supporting the outer gimbal frame for swinging movement about an axis extending transversely of an airplane, a weight, means normal to the outer gimbal frame for guiding the weight toward and away from said frame, an inner gimbal frame, means pivotally supporting the inner gimbal frame in neutral, balanced equilibrium for swinging movement about an axis normal to the pivotal axis of said outer gimbal frame, said inner gimbal frame provided with a guideway having a point tangent to an arc whose center lies on the pivotal axis of said inner gimbal frame, said guideway normally extending horizontally and parallel to said transversely extending axis, a pin movable with said weight and slidable along said guideway, resilient means carried by the outer gimbal frame for normally supporting the weight against movement relative to the outer gimbal frame with said pin aligning with said tangent point and with said resilient means normally strained by said weight a distance substantially equal to the distance between said longitudinal axis and said tangent point.

6. In a device of the character described, an outer gimbal frame, means adapted to be carried by an airplane for pivotally supporting the outer gimbal frame for swinging movement about an axis in the normally horizontal plane of the airplane and transversely thereof, a weight, means normal to the outer gimbal frame for guiding the weight toward and away from said frame, an inner gimbal frame, means pivotally supporting the inner gimbal frame in neutral, balanced equilibrium for swinging movement about an axis normal to the pivotal axis of said outer gimbal frame, said inner gimbal frame provided with a guideway having a point tangent to an arc whose center lies on the pivotal axis of said inner gimbal frame, said guideway normally extending horizontally and parallel to said transversely extending axis, an element movable with said weight and slidable along said guideway, resilient means carried by the outer gimbal frame for normally supporting the weight against movement relative to the outer gimbal frame with said element aligning with said tangent point and with said resilient means normally strained by said weight a distance substantially equal to the distance between said longitudinal axis and said tangent point.

7. In a sight adapted to be maintained in a level position in an airplane, a supporting frame, a support, means carried by the frame for pivotally securing the support to the frame for angular swinging movement about an axis transversely of the direction of travel of the airplane, means releasably fixing the support relative to the frame in any one of a plurality of angularly adjusted positions, rotary means carried by said support for rotation about an axis normal to said transverse axis, and a sight member supported by said rotary means for movement transversely of said rotary means.

8. In a sight adapted to be maintained in a level position in an airplane, a supporting frame, a support, means carried by the frame for pivotally securing the support to the frame for angular swinging movement about an axis transversely of the direction of travel of the airplane, means releasably fixing the support in any one of a plurality of angularly adjusted positions relative to the frame, rotary means carried by said support for rotation about an axis normal to said transverse axis, a sight member, means supporting the sight member for movement transversely of said rotary means into any one of a plurality of positions of adjustment, and means for automatically balancing the rotary member with said sight member in any one of said positions.

9. In a sight adapted to be maintained in a level position in an airplane, a supporting frame, a support, means carried by the frame for pivotally securing the support relative to the frame for swinging movement about an axis extending transversely of the direction of travel of the airplane, means for fixing the support relative to the frame in any one of a plurality of angularly adjusted positions about said transverse axis, a carriage, means securing the carriage to said support for rotation about an axis normal to said transverse axis, a lens holder, means mounting the lens holder in said carriage for lateral movement transversely of said carriage, a screen provided with circular delineations defining arcuate segmental areas constituting image paths of ground objects during curved balanced flight of the airplane, said paths terminating at one end in a point centrally of the screen, and means securing the screen to said support and so positioned above the lens holder as to display images of ground objects in said arcuate segmental areas.

10. In a sight adapted to be maintained in a level position in an airplane, a supporting frame, a support, means carried by the frame for pivotally securing the support relative to the frame for swinging movement about an axis transversely of the direction of travel of the airplane, means for fixing the support relative to the frame in any one of a plurality of angularly adjusted positions about said transverse axis, a carriage, means securing the carriage to said support for rotation about an axis normal to said transverse axis, a lens holder, means mounting the lens holder in said carriage for lateral movement transversely of said carriage, a screen provided with circular delineations defining arcuate segmental areas constituting image paths of ground objects during curved balanced flight of the airplane, said paths terminating at one end in a point centrally of the screen, means securing the screen to said support and so positioned above the lens holder as to display images of ground objects in said arcuate segmental areas, and means for indicating the relative position of said screen with respect to said lens holder.

11. In a device of the character described including a lens holder adapted to be maintained with its axis vertical in an airplane during curved balanced flight thereof, a viewing screen provided with circular delineations defining arcuate segmental areas constituting image paths of ground objects during curved balanced flight of the airplane, said paths terminating at their ends in a point centrally of the screen, and means so positioning the screen above the lens holder as to display images of ground objects in said arcuate segmental areas.

12. Apparatus for detecting change in the attitude of a body relative to the earth's radius, comprising means mounted to swing detectably about a normally horizontal axis relative to the body, and means for maintaining said first-mentioned means in a predetermined position relative to the earth's radius, including reciprocable pendulous means having a weight W, means carried by the first-mentioned means for defining a rectilinear path of reciprocation of said pendulous means lying a distance L below and perpendicular to said axis, said pendulous means including spring supporting means therefor having a rate substantially equal to W/L and adapted to exert force transversely of said path-defining means and upon said first-mentioned means when said first-mentioned means departs from said predetermined position, said path-defining means and said pendulous means cooperating to effect restoration of said first-mentioned means by exertion of said force on the latter, to said predetermined position in response to departure of the first-mentioned means therefrom.

HARRY B. MARIS.

REFERENCES CITED

The following references are of record in the file of this patent:

UNITED STATES PATENTS

| Number | Name | Date |
| --- | --- | --- |
| 1,152,946 | Hasburg | Sept. 7, 1915 |
| 1,296,640 | Estoppey | Mar. 11, 1919 |
| 1,446,280 | Titterington | Feb. 20, 1923 |
| 1,837,609 | Carter | Dec. 22, 1931 |

FOREIGN PATENTS

| Number | Country | Date |
| --- | --- | --- |
| 316,167 | Germany | Jan. 28, 1920 |